United States Patent
Khokhar

(10) Patent No.: US 6,196,751 B1
(45) Date of Patent: Mar. 6, 2001

(54) STUD MOUNTED FASTENER FOR ROUTING WIRE

(75) Inventor: Wasim Khokhar, Cordova, TN (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/151,947

(22) Filed: Sep. 11, 1998

(51) Int. Cl.$^7$ ................. F16D 1/00; F16L 25/00
(52) U.S. Cl. ................. 403/3; 403/4; 403/384; 24/16 PB; 24/17 AP; 24/30.5 P; 248/69; 248/74.3
(58) Field of Search .................. 403/3, 4, 396, 403/389, 399, 398, 384; 248/69, 73, 74.3, 65; 24/16 PB, 30.5 P, 17 AP

(56) References Cited

U.S. PATENT DOCUMENTS

| | | |
|---|---|---|
| 3,250,505 | 5/1966 | Rodman et al. .................. 248/74.3 |
| 3,264,021 | 8/1966 | Artman ................................. 403/3 |
| 3,486,725 | 12/1969 | Hidassy ................................ 248/68 |
| 3,913,876 | 10/1975 | McSherry ........................ 248/74 PB |
| 4,379,537 | 4/1983 | Perrault et al. ................... 248/74 R |
| 4,518,297 | 5/1985 | Kraus ................................... 411/437 |
| 4,541,153 | 9/1985 | Schaty ................................. 24/305 |
| 4,550,891 | 11/1985 | Schaty ............................... 248/68.1 |
| 4,717,100 | 1/1988 | Klein ..................................... 248/73 |
| 4,728,064 | 3/1988 | Caveney ............................ 248/74.3 |
| 4,826,379 | 5/1989 | Norden ............................... 411/366 |
| 4,859,129 | 8/1989 | Kraus ................................... 411/512 |
| 4,867,400 | 9/1989 | Reindl ............................... 248/68.1 |
| 4,905,942 | 3/1990 | Moretti .............................. 248/68.1 |
| 4,934,889 | 6/1990 | Kurosaki ............................. 411/433 |
| 4,999,019 | 3/1991 | Kraus ................................... 411/512 |
| 5,098,242 | 3/1992 | Schaty ................................. 411/437 |
| 5,154,376 | 10/1992 | Baum et al. ....................... 248/74.3 |
| 5,291,639 | 3/1994 | Baum et al. ......................... 24/297 |
| 5,302,070 | 4/1994 | Kameyama et al. ............... 411/437 |
| 5,332,179 | 7/1994 | Kuffel et al. ...................... 248/74.3 |
| 5,423,647 | 6/1995 | Suzuki ................................. 411/433 |
| 5,538,208 | 7/1996 | Cordes et al. ..................... 248/74.3 |
| 5,598,994 | 2/1997 | Olewinski et al. .................. 248/73 |
| 5,730,399 | 3/1998 | Baginski .......................... 24/16 PB |
| 5,820,083 | 10/1998 | Geiger .............................. 248/74.3 |

FOREIGN PATENT DOCUMENTS

| | | | |
|---|---|---|---|
| 2180195 | 12/1996 | (CA) | ............................ F16B/37/00 |
| 0774610 A2 | 5/1997 | (EP) | ............................. F16L/3/233 |
| 1265344 | 5/1960 | (FR) | ........................................ 403/3 |
| 10-200649 | 8/1998 | (JP) . | |

Primary Examiner—Lynne H. Browne
Assistant Examiner—Ernesto Barcia
(74) Attorney, Agent, or Firm—G. Andrew Barger

(57) ABSTRACT

A stud mounted fastener for routing a plurality of wires in a plurality of directions at the fastener and securing at least one of the plurality of wires to the fastener via a cable tie. The fastener includes an abutment member for mounting on the stud. A first wing is coupled to the abutment member and has a first bar enabled to receive a cable tie thereabout for securing at least one of the plurality of wires thereto, and a second wing coupled to the abutment member and has a second bar enabled to receive a cable tie thereabout for securing at least one of the plurality of wires thereto. A first projection is coupled to the abutment member and has a first projection bar enabled to also receive a cable tie thereabout for securing at least one of the plurality of wires thereto. At least one of the first and second wings is in a different cross-sectional plane than the first projection.

18 Claims, 4 Drawing Sheets

STUD MOUNTED FASTENER FOR ROUTING WIRE

FIELD OF THE INVENTION

In general, the present invention relates to wire routing. And, in particular, the present invention relates to a stud mounted fastener having a plurality of passageways for receiving a cable tie therethrough, and a plurality of bars for bending a cable tie thereabout, for enabling the routing of wire in a plurality of directions at the fastener and securing of the wire to the fastener via one or more cable ties.

BACKGROUND

Modern vehicles have numerous electronic and electromechanical devices installed therein, which require a large number of wires to be run throughout vehicles for the proper operation and system coupling of these devices. Typical stud mounted fasteners, as shown in FIG. 12, do a poor job at routing these many wires and securing the wires against the fastener because of a low number of passageways for receiving a cable tie therethrough, and a low number of bars for bending a cable tie thereabout, such as the two axially aligned bars 82, 84 shown in FIG. 12. This limits the wires that can be secured to the fastener by the cable ties and further limits the number of directions that the wires can be routed in the vehicle.

SUMMARY OF THE INVENTION

The present invention eliminates the above difficulties and disadvantages by providing a stud mounted fastener for routing a plurality of wires in a plurality of directions at the fastener and securing at least one of the plurality of wires to the fastener via a tie. The fastener includes an abutment member for mounting on the stud. A first wing is coupled to the abutment member and has a first bar enabled to receive a cable tie thereabout for securing at least one of the plurality of wires thereto when the cable tie is tightened, and a second wing coupled to the abutment member that has a second bar also enabled to receive a cable tie thereabout for securing at least one of the plurality of wires thereto. A first projection is coupled to the abutment member and has a first projection bar enabled to receive a cable tie thereabout for securing at least one of the plurality of wires thereto. At least one of the first and second wings is in a different cross-sectional plane than the first projection. A base is formed with the abutment member and includes the first and second bars.

An advantage of the present invention is that a wing passageway extends between the first and second wings, and the base and the wall for receiving the at least one cable tie therethrough. A second projection is coupled to the abutment member and has a second projection bar enabled to receive a cable tie thereabout for securing at least one of the plurality of wires thereto when the cable tie is tightened.

Another advantage is that a projection passageway extends between the first and second projections for receiving the at least one cable tie therethrough. Further, when the at least one cable tie is received through the wing passageway, at least one of the plurality of wires can be secured to the base of the fastener.

Moreover, at least one of the plurality of wires secured to the first and second projections may be routed in one of the plurality of directions different than one of the plurality of wires routed at one of the first and second wings. Further, when the cable tie is received through the projection passageway, at least one of the plurality of wires can be secured to the base of the fastener.

DETAILED DESCRIPTION OF THE PREFERRED EMBODIMENT(S)

Figure 1:
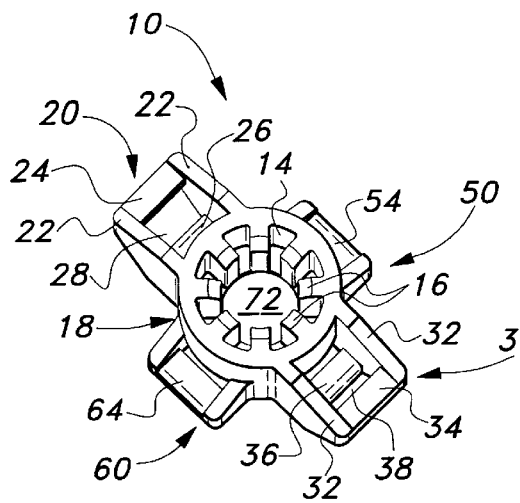
FIG. 1 is a perspective view of a fastener of the present invention.

The above and other features, aspects, and advantages of the present invention will now be discussed in the following detailed description and appended claims, which are to be considered in conjunction with the accompanying drawings in which identical reference characters designate like elements throughout the views. Shown in FIG. 1 is a stud mounted fastener 10 for routing a plurality of wires 76, as shown in FIGS. 7–11, in a plurality of directions at the fastener 10 and securing at least one of the plurality of wires 76 to the fastener 10 via at least one of a plurality of cable ties 74. The cable ties 74 reference throughout are preferably of the type manufactured under the trademark TY-RAP by the Thomas & Betts Corporation having a principal place of business at 8155 T&B Boulevard, Memphis, Tenn. 38125. The fastener 10 is preferably constructed of nylon, but could also be constructed of any thermo-plastic that is relatively hard and durable.

The fastener 10 includes an abutment member 18 for mounting on the stud 12, the abutment member 18 has a solid wall 72 formed therein and a plurality of tangs 16 integrally formed with the wall 72, which project outward therefrom and perimetrically bound the wall 72 forming an aperture 14. During installation, when the fastener 10 is mounted on the stud 12, the aperture 14 receives the stud 12 therein and the plurality of tangs 16 grab the threads of the stud 12. Thereafter, the fastener 10 is rotated on the stud 12 such that the tangs 16 releasably tighten and the stud 12 abuts the wall 72. Once installed, the wires 76 can be routed in a plurality of directions at the fastener 10.

Figure 4:
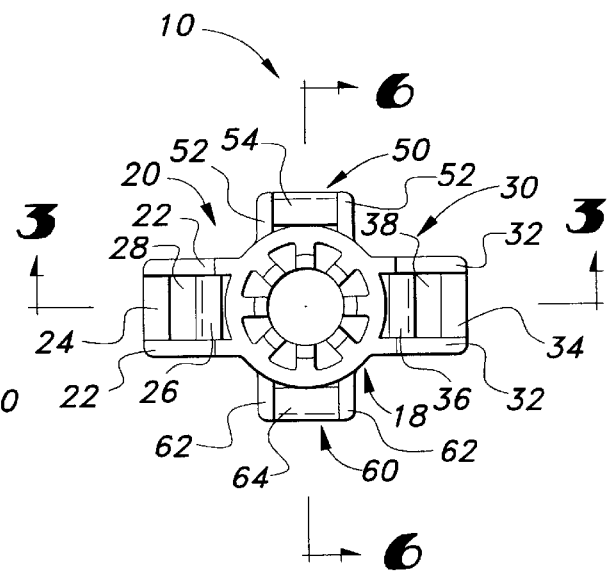
FIG. 4 is top plan view of the fastener of the present invention.
Figure 5:
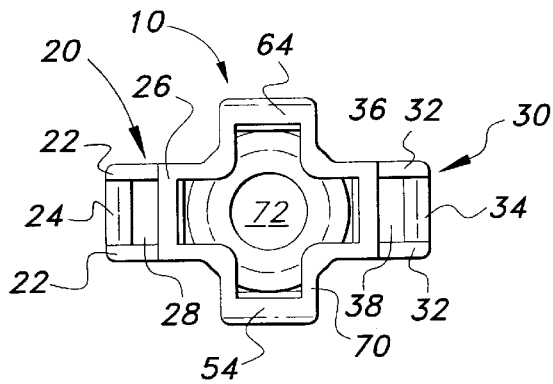
FIG. 5 is bottom plan view of the fastener of the present invention.

As best shown in FIGS. 1, 4, and 5, a first wing 20 and a second wing 30 are integrally formed with the fastener 10 and help aid in the rotation on the fastener 10 on the stud 12.

Figure 2:
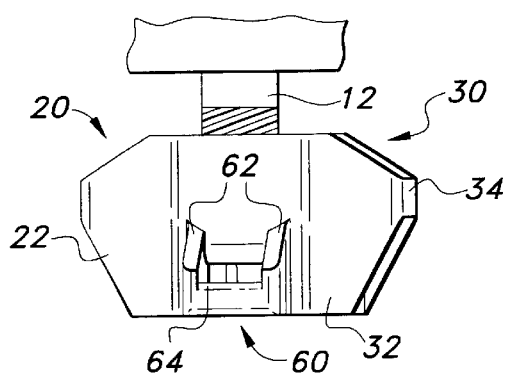
FIG. 2 is another perspective view of the fastener of the present invention.
Figure 7:
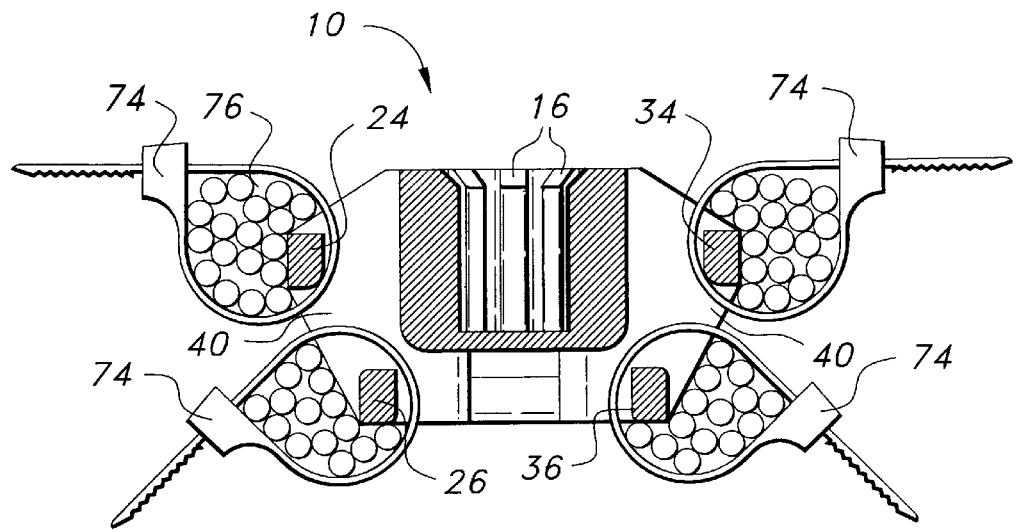
FIG. 7 is a cross sectional view of the fastener of the present invention taken along sight line A—A of FIG. 4, showing various cable tie and wire routing arrangements.
Figure 8:
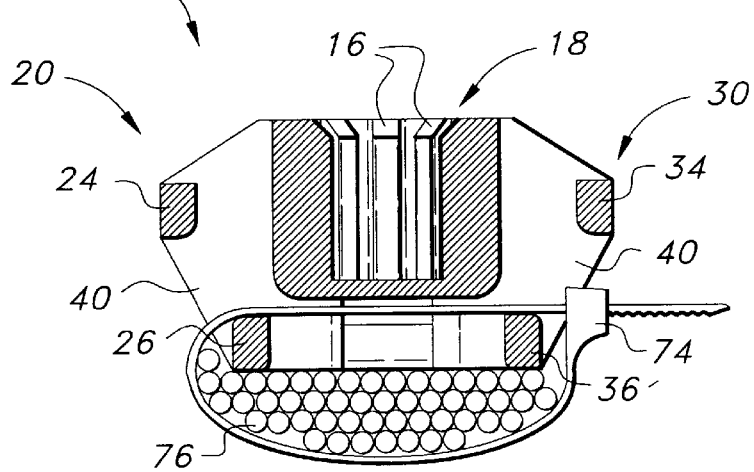
FIG. 8 is a cross sectional view of the fastener of the present invention taken along sight line A—A of FIG. 4, showing various cable tie and wire routing arrangements.
Figure 9:
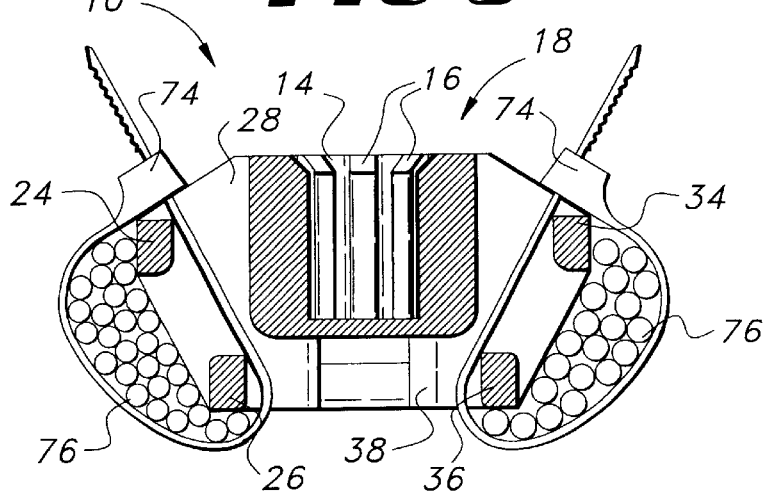
FIG. 9 is a cross sectional view of the fastener of the present invention taken along sight line A—A of FIG. 4, showing a cable tie and wire routing arrangement.

The first wing 20 is coupled to the abutment member 18 by integral formation and has a generally rectangular cross-sectioned, first bar 26 that is enabled to receive a cable tie 74 thereabout for securing at least one of the plurality of wires 76 thereto when the cable tie 74 is tightened, as shown in FIGS. 7, 8, and 9. The first bar 26 is disposed between a first pair of extension walls 22, which are generally triangular in shape, as is best seen in FIG. 2.

Figure 3:
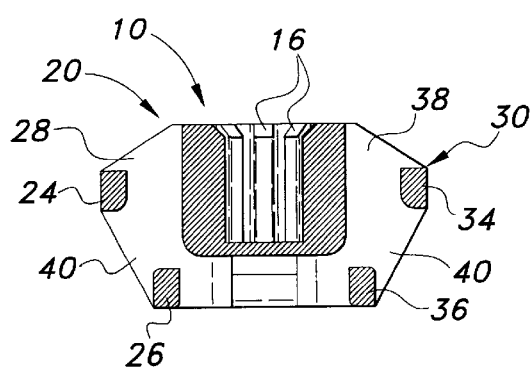
FIG. 3 is a cross sectional view of the fastener of the present invention taken along sight line A—A of FIG. 4.

Further disposed between the first pair of extension walls 22 is a first end bar 24, as shown in FIGS. 1, 3, 4, 5, 7, 8, and 9, which also has a generally rectangular cross-section and is enabled to receive the cable tie 74 thereabout for securing at least one of the plurality of wires 76 thereto, as shown in FIGS. 7 and 9. A first cable tie passageway 28, as shown in FIG. 3, is defined by the first bar 26 and the first end bar 24 on one side and the abutment member 18 on the other side. The passageway 28 allows for the cable tie 74 to be inserted therethrough and to fasten a plurality of wires 76 along the side of the fastener 10 next to the first bar 26 and first end bar 24.

The second wing 30 is coupled to the abutment member 18 by integral formation and is axially aligned with, and spaced apart from, the first wing 20. The second wing 30 has a second bar 36, which has a generally rectangular cross-section, is enabled to receive the cable tie 74 thereabout for securing at least one of the plurality of wires 76 thereto when the cable tie 74 is tightened, as shown in FIGS. 7, 8, and 9. The second bar 36 is disposed between a second pair of extension walls 32, which are generally triangular in shape, as is best seen in FIG. 2.

Further disposed between the second pair of extension walls 32 is a second end bar 34, as shown in FIGS. 1, 3, 4, 5, 7, 8, and 9, which also has a generally rectangular cross-section and is enabled to receive the cable tie 74 thereabout for securing at least one of the plurality of wires 76 thereto via when the cable tie 74 is tightened, as shown in FIGS. 7 and 9. A second cable tie passageway 38, as shown in FIG. 3, is defined by the second bar 36 and the second end bar 34 on one side, and the abutment member 18 on the other side. The passageway 38 allows for a cable tie 74 to be inserted therethrough and to fasten a plurality of wires 76 along the side of the fastener 10 next to the second bar 36 and second end bar 34 when the cable tie 74 is tightened.

Further provided in the fastener 10 is a wing passageway 40 that extends between the first wing 20 and the second wing 30, and that is also defined by a base 70 of the abutment member 18 and the wall 72 for receiving the cable tie 74 therethrough. Therefore, when the cable tie 74 is received through the wing passageway 40, at least one of the plurality of wires 76 can be secured to the base 70 of the fastener 10 when the cable tie 74 is tightened.

Referring with particularity to FIGS. 7–9, it is shown that a cable tie 74 can be fastened in seven different ways for the bundling and routing of wires 76 a plurality of directions at the fastener 10 when the cable ties are coupled about the first bar 26, first end bar 24, second bar 36, second end bar 34, and wing passageway 40. For example, in FIG. 7, cable ties are shown fastening wires to the first bar 26, first end bar 24, second bar 36, and second end bar 34, such that the wire 76 may be routed in a direction that is at a right angle to the first pair of extension walls 22 and the second pair of extension walls 32. Now referring to FIG. 8, a plurality of wires 76 are shown secured to the base 70 of the fastener 10 via a cable tie 74 that is inserted through the wing passageway 40. Also, in FIG. 9 is shown cable ties inserted through the first cable tie 74 passageway 28 and the second cable tie 74 passageway 38 such that a plurality of wires 76 are secured to opposite sides of the fastener 10 between the first bar 26 and first end bar 24, and the second bar 36 and second end bar 34, respectively.

Figure 6:
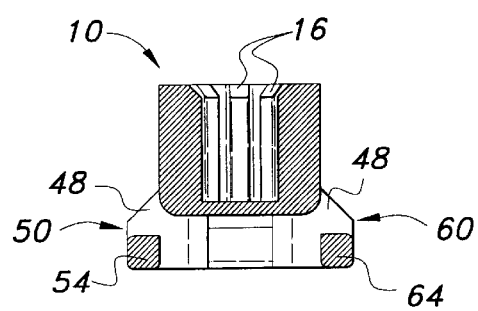
FIG. 6 is a cross sectional view of the fastener of the present invention taken along sight line B—B of FIG. 4.
Figure 10:
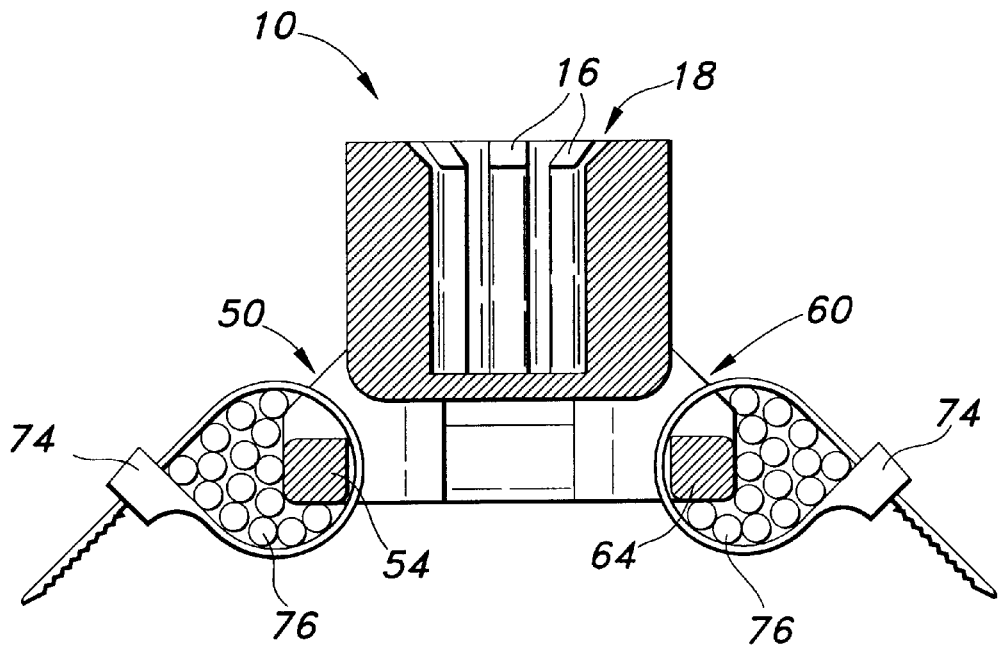
FIG. 10 is a cross sectional view of the fastener of the present invention taken along sight line B—B of FIG. 4, showing various cable tie and wire routing arrangements.
Figure 11:
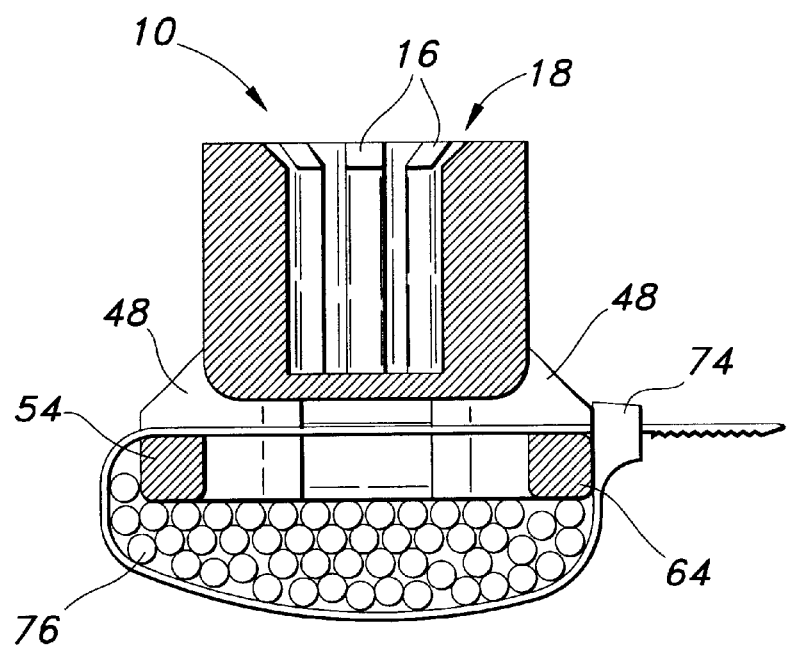
FIG. 11 is a cross sectional view of the fastener of the present invention taken along sight line B—B of FIG. 4, showing various cable tie and wire routing arrangements.
Figure 12:
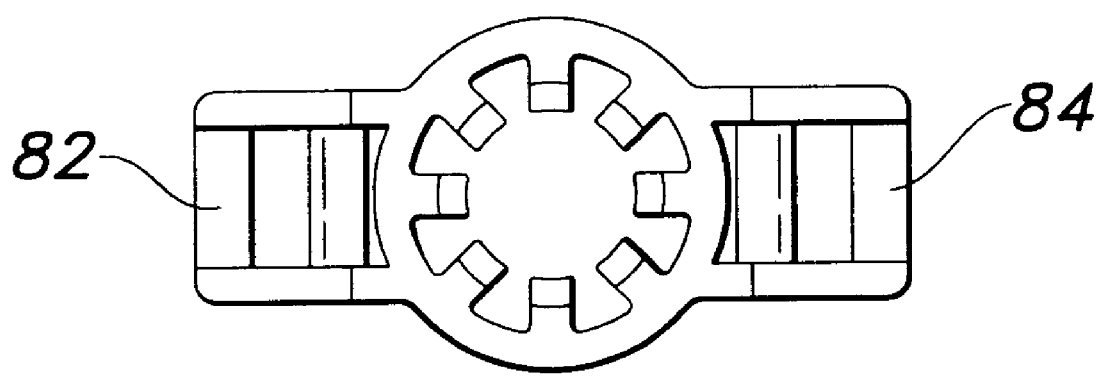
FIG. 12 is a prior art stud mounted fastener.

As best shown in FIGS. 1 and 4, the present fastener 10 further provides a first projection 50 and a second projection 60 coupled to the abutment member 18. The first projection 50 has a generally square cross-sectioned, first projection bar 54, as shown in FIGS. 6, 10, and 11, for receiving a cable tie 74 thereabout for subsequently securing at least one of the plurality of wires 76 thereto when the cable tie 74 is tightened. As shown in FIGS. 1 and 4, the first projection bar 54 is disposed between, and integrally formed with, a first pair of projection walls 52, which are also coupled to the abutment member 18. As shown in FIG. 10, a cable tie 74 can be used to secure a plurality of wires 76 to the first projection bar 54 when the cable tie 74 is tightened.

As best shown in FIGS. 1 and 4, a second projection 60, in axial alignment with, and spaced apart from, the first projection 50 is also coupled to the abutment member 18 via integral formation and has a second projection bar 64 enabled to receive a cable tie 74 thereabout for securing at least one of the plurality of wires 76 thereto when tightened. The second projection 60 further includes a second pair of projection walls 62 wherein the second projection bar 64 is disposed and coupled thereto. As shown in FIG. 10, a cable tie 74 can be used to secure a plurality of wires 76 to the second projection bar 64 when the cable tie 74 is tightened.

The first wing 20 and second wing 30 are preferably each generally orthogonal to the first projection 50 and the second projection 60. It is understood, however, in the present invention that it is important for routing the wire 76 in a plurality of directions at the fastener 10 that at least one of the first wing 20 or the second wing 30 be in a different cross-sectional plane than the first projection 50 or the second projection 60. It is also understood that the wire 76, when secured to the fastener 10, may be bent at the location of the securing cable tie 74 and routed in a different direction thereto. Further, a least one of the plurality of wires 76 secured to the first projection 50 or second projection 60 may be routed in one of the plurality of directions different than one of the plurality of wires 76 routed at either of the first wing 20 or the second wing 30.

A projection passageway 48, as shown in FIG. 11, extends between the first projection 50 and the second projection 60, and the base 70 and the wall 72, for receiving a cable tie 74 therethrough, such that at least one of the plurality of wires 76 can be secured to the base 70 of the fastener 10 when the cable tie 74 is tightened. This allows for one or more wires 76 to be secured to the base 70 of the fastener 10 and routed in a direction perpendicular to the first projection 50 and the second projection 60. Moreover, the base 70 is integrally formed with the abutment member 18 and includes the first and second bars 26, 36 and the first and second projection bars 54, 64 as shown in FIG. 5.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A stud mounted fastener for routing a plurality of wires in a plurality of directions at the fastener and securing at least one of the plurality of wires to the fastener via at least one of a plurality of cable ties, the fastener comprising:
an abutment member for mounting on the stud, the abutment member having a wall formed therein;
a first wing coupled to the abutment member and having a first bar enabled to receive at least one of the plurality of cable ties thereabout for securing at least one of the plurality of wires thereto;
a second wing coupled to the abutment member and having a second bar enabled to receive at least one of the plurality of cable ties thereabout for securing at least one of the plurality of wires thereto;
a wing passageway extending between the first and second wings, and the wall for receiving the at least one cable tie therethrough; and
a first projection coupled to the abutment member and disposed in a different vertical cross-sectional plane than one of the first and second wings, the first projection having a first projection bar enabled to receive at least one of the plurality of cable ties thereabout for securing at least one of the plurality of wires thereto.

2. The fastener of claim 1 wherein at least one of the first and second wings is in a different vertical cross-sectional plane than the first projection.

3. The fastener of claim 1 further comprising a second projection coupled to the abutment member and having a second projection bar enabled to receive at least one of the plurality of cable ties thereabout for securing at least one of the plurality of wires thereto.

4. The fastener of claim 3 wherein at least one of the first and second wings is in a different cross-sectional plane than the second projection.

5. The fastener of claim 3 further comprising a projection passageway extending between the first and second projections for receiving the at least one cable tie therethrough.

6. The fastener of claim 1 wherein the wall of the abutment member is solid and contacts the stud when the fastener is mounted on the stud.

7. The fastener of claim 1 wherein the at least one cable tie is received through the wing passageway for routing the at least one of the plurality of wires in one of the plurality of directions at the fastener and for securing the at least one of the plurality of wires to the fastener via the at least one cable tie.

8. The fastener of claim 3 wherein the at least one of the plurality of wires secured to the first and second projections may be routed in one of the plurality of directions different than one of the plurality of wires secured to and routed at one of the first and second wings.

9. The fastener of claim 5 wherein the at least one cable tie is received through the projection passageway for routing the at least one of the plurality of wires in one of the plurality of directions at the fastener and for securing the at least one of the plurality of wires to the fastener via the at least one cable tie.

10. A stud mounted fastener for routing a plurality of wires in a plurality of directions at the fastener and securing at least one of the plurality of wires to the fastener via at least one of a plurality of cable ties, the fastener comprising:
an abutment member for mounting on the stud, the abutment member having a wall formed therein;
a first wing coupled to the abutment member and having a first bar enabled to receive at least one of the plurality of cable ties thereabout for securing at least one of the plurality of wires thereto;
a second wing coupled to the abutment member and having a second bar enabled to receive at least one of the plurality of cable ties thereabout for securing at least one of the plurality of wires thereto;
a wing passageway extending between the first and second wings, and the wall for receiving the at least one cable tie therethrough;
a first projection coupled to the abutment member and disposed in a different vertical cross-sectional plane than one of the first wing or the second wing, the first projection having a first projection bar enabled to receive at least one of the plurality of cable ties thereabout for securing at least one of the plurality of wires thereto;
a second projection coupled to the abutment member and disposed in a different vertical cross-sectional plane than one of the first wing or the second wing, the second projection having a second projection bar enabled to receive at least one of the plurality of cable ties thereabout for securing at least one of the plurality of wires thereto; and
wherein the first and second wings are each generally orthogonal to the first and second projections.

11. The fastener of claim 10 further comprising a base including the first and second bars and the first and second projection bars.

12. The fastener of claim 10 further comprising a projection passageway extending between the first and second projections, and the wall for receiving the at least one cable tie therethrough.

13. The fastener of claim 10 wherein the wall of the abutment member is solid and contacts the stud when the fastener is mounted on the stud.

14. The fastener of claim 10 wherein the at least one cable tie is received through the wing passageway for routing the at least one of the plurality of wires in one of the plurality of directions at the fastener and for securing the at least one of the plurality of wires to the fastener via the at least one cable tie.

15. The fastener of claim 10 wherein the at least one of the plurality of wires secured to the first and second projections may be routed in one of the plurality of directions different than one of the plurality of wires secured to and routed at one of the first and second wings.

16. The fastener of claim 12 wherein the at least one cable tie is received through the projection passageway for routing the at least one of the plurality of wires in one of the plurality of directions at the fastener and for securing the at least one of the plurality of wires to the fastener via the at least one cable tie.

17. A stud mounted fastener for routing a plurality of wires in a plurality of directions at the fastener and securing at least one of the plurality of wires to the fastener via at least one of a plurality of cable ties, the fastener comprising:
an abutment member for mounting on the stud, the abutment member having a solid wall formed therein;
a first wing coupled to the abutment member and having a first bar enabled to receive at least one of the plurality of cable ties thereabout for securing at least one of the plurality of wires thereto;
a second wing coupled to the abutment member and having a second bar enabled to receive at least one of the plurality of cable ties thereabout for securing at least one of the plurality of wires thereto;

a first projection coupled to the abutment member and having a first projection bar enabled to receive at least one of the plurality of cable ties thereabout for securing at least one of the plurality of wires thereto;

a second projection coupled to the abutment member and having a second projection bar enabled to receive at least one of the plurality of cable ties thereabout for securing at least one of the plurality of wires thereto;

a base integrally formed with abutment member and including the first and second bars and the first and second projection bars;

a wing passageway extending between the first and second wings, and the base and the wall for receiving the at least one cable tie therethrough, such that when the at least one cable tie is received through the wing passageway for routing the at least one of the plurality of wires in one of the plurality of directions at the fastener and for securing the at least one of the plurality of wires to the fastener via the at least one cable tie;

a projection passageway extending between the first and second projections, and the wall for receiving the at least one cable tie therethrough, such that when the at least one cable tie is received through the projection passageway for routing the at least one of the plurality of wires in one of the plurality of directions at the fastener and for securing the at least one of the plurality of wires to the fastener via the at least one cable tie; and wherein the first and second wings are each generally orthogonal to the first and second projections.

18. The fastener of claim 17 wherein one of the plurality of wires secured to the first and second projections may be routed in one of the plurality of directions different than one of the plurality of wires secured to and routed at one of the first and second wings.

* * * * *